E. P. WEBSTER.
UNIVERSAL ROLLER BEARING.
APPLICATION FILED JULY 2, 1920.
1,379,667.
Patented May 31, 1921.
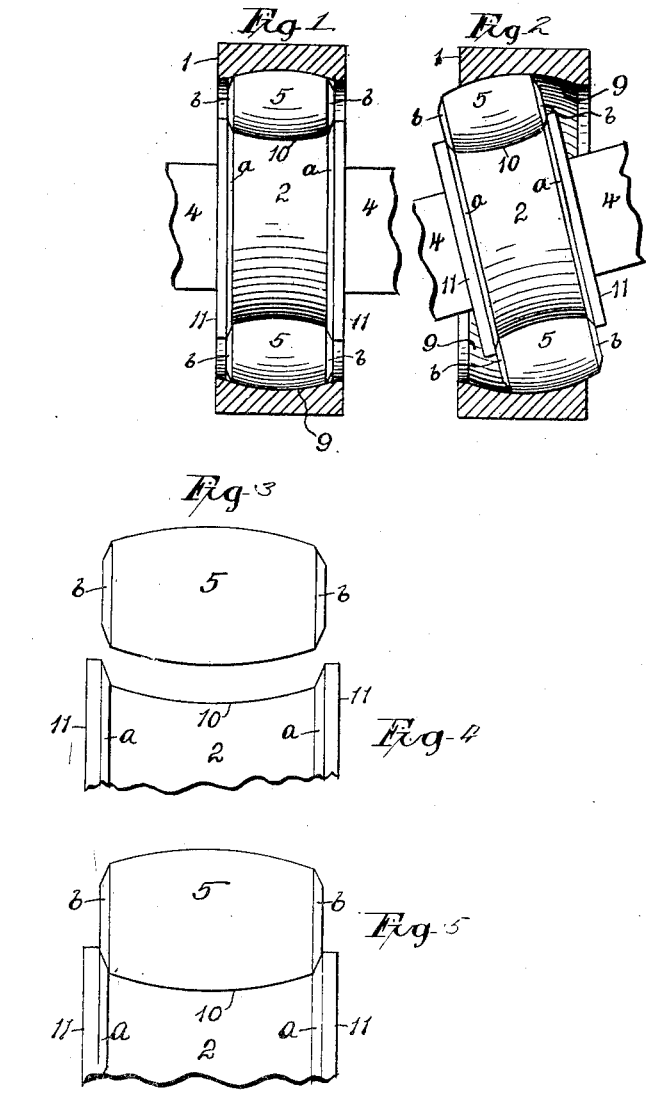
INVENTOR
Edgar P. Webster
BY Geo. D. Phillips
his ATTORNEY

UNITED STATES PATENT OFFICE.

EDGAR P. WEBSTER, OF BRIDGEPORT, CONNECTICUT.

UNIVERSAL ROLLER-BEARING.

1,379,667.  Specification of Letters Patent.  Patented May 31, 1921.

Application filed July 2, 1920. Serial No. 393,622.

*To all whom it may concern:*

Be it known that I, EDGAR P. WEBSTER, citizen of the United States, residing at Bridgeport, in the county of Fairfield and State of Connecticut, have invented certain new and useful Improvements in Universal Roller-Bearings; and I do hereby declare the following to be a full, clear, and exact description of the invention, such as will enable others skilled in the art to which it appertains to make and use the same.

My invention relates to an improvement in universal roller bearings, and it consists in certain details of construction to be more fully set forth in the following specification.

Referring to the accompanying drawings wherein the same figures and letters of reference indicate like parts throughout the several views:

Figure 1 is a central sectional view of the outer race ring, full view of the inner race ring and two of the rollers, and broken view of the shaft on which the inner race ring is mounted.

Fig. 2 is a view similar to Fig. 1 except that the inner race ring is tilted.

Fig. 3 is an enlarged detail view of one of the rollers.

Fig. 4 is an enlarged broken detail view of the inner race ring, and

Fig. 5 is an enlarged broken view of the inner race ring and one of the rollers mounted thereon.

1 represents the outer race ring and 2 the inner race ring, the latter having the central bore 3 to receive the shaft 4.

The outer race ring has the circumferential track 9 curved in cross section and the inner race ring has the curved track 10 corresponding to the curved track of the outer ring. The curved peripheries of the rollers 5 bear equally against the curved tracks of the rings so that the rotation of the inner race ring will rotate the several rollers and thus effect a frictionless roller bearing. The slightest deflection of the shaft 4, in any direction, will tilt the inner ring to conform thereto, and the rollers will freely rotate in whatever angular position the inner race ring may assume with respect to the outer race ring.

Supplemental to the construction of the race rings and rollers as above described. I provide the inner faces of the flanges 11 of the inner race ring with the circular outwardly tapered seats *a* adapted to register with the tapered ends *b* of the rollers, as shown in Figs. 4 and 5. This arrangement will always maintain an antifrictional contact between the rollers and the inner race ring, so that the rollers will always rotate on the seats of the inner ring and never slide, regardless of the position that the inner ring may assume. To make the ends of the rollers and the inner faces of the flanges straight, would require more or less end play for the rollers and cause them to turn and cramp against the sides of the flanges, but with the inclined tracking feature, it would be impossible for the rollers to turn.

Having thus described my invention what I claim as new and novel is:—

In a universal roller bearing, an outer and an inner race ring, each having a track curved in cross section, the inner ring having side flanges, said flanges being each formed with circular seats which taper outwardly so that the tapered seats are divergently related, and rollers between the rings conforming to the curves of the tracks, the ends of the rollers being free of connection with one another and being tapered to conform to the tapered seats and being engaged therewith so that upon tilting of the inner race ring the rollers will move therewith but will not have any sliding action independent of the said inner race ring, the taper of the rollers and of the seats therefor being such so that upon tilting of the inner race ring the pressure exerted by the seats against the roller ends will be in planes substantially radially of the outer track curvature.

In testimony whereof I affix my signature.

EDGAR P. WEBSTER.